US007487672B2

(12) United States Patent
Tatsuno

(10) Patent No.: US 7,487,672 B2

(45) Date of Patent: Feb. 10, 2009

(54) FUEL OIL AMOUNT INDICATOR OF MEASURING APPARATUS

(75) Inventor: Hiyoshi Tatsuno, Tokyo (JP)

(73) Assignee: Tatsuno Corporation, Tokyo (JP)

( * ) Notice: Subject to any disclaimer, the term of this patent is extended or adjusted under 35 U.S.C. 154(b) by 241 days.

(21) Appl. No.: 11/398,435

(22) Filed: Apr. 5, 2006

(65) Prior Publication Data

US 2006/0225495 A1 Oct. 12, 2006

(30) Foreign Application Priority Data

Apr. 7, 2005 (JP) ............................ 2005-110756

(51) Int. Cl.
*G01F 17/00* (2006.01)

(52) U.S. Cl. ........................................ 73/149; 362/210

(58) Field of Classification Search .................... 73/149
See application file for complete search history.

(56) References Cited

U.S. PATENT DOCUMENTS 5,819,454 A * 10/1998 Rosenitsch ................... 40/452

FOREIGN PATENT DOCUMENTS

| | | | |
|---|---|---|---|
| DE | 4428542 A1 * | 2/1996 | |
| FR | WO 0049332 A1 * | 8/2000 | |
| JP | 03072392 A * | 3/1991 | |
| JP | 06324066 A * | 11/1994 | |
| JP | 19806286 A1 * | 8/1998 | |
| JP | 2000329562 A * | 11/2000 | |
| JP | 2001-242798 | 9/2001 | |
| JP | WO 03010739 A1 * | 2/2003 | |

* cited by examiner

*Primary Examiner*—Hezron Williams
*Assistant Examiner*—Samir M Shah
(74) *Attorney, Agent, or Firm*—Jordan and Hamburg LLP

(57) ABSTRACT

There is provided a fuel oil amount indicator of a measuring apparatus in which a lifetime of the indicator can be prolonged, maintenance work can be omitted, and visibility can always be improved. In the indicator of the invention, a plurality of light emitting elements are arrayed in a matrix form, and as the light emitting elements, high-luminance LEDs are used. An outside light sensor provided in the vicinity of the indicator detects brightness of outside light, and a light emission intensity of the light emitting elements is changed in accordance with the thus detected brightness. The light emitting elements have a plurality of luminous colors predetermined to correspond to a type of fuel oil. The indicator is provided with inclination means for inclining a display surface in response to an operation of an angle adjustment operating portion. The indicator is further provided with a diffusion plate for diffusing light to a front face of the light emitting elements.

9 Claims, 4 Drawing Sheets

FUEL OIL AMOUNT INDICATOR OF MEASURING APPARATUS

BACKGROUND OF THE INVENTION

1. Field of the Invention

The present invention relates to a fuel oil amount indicator of a measuring apparatus for displaying an amount of a fuel oil fed to a vehicle or the like at an oil station.

2. Description of the Related Art

Usually, a measuring apparatus for feeding a fuel oil which is installed at an oil station to feed the fuel oil is provided with a fuel oil amount indicator for displaying the amount of the fed fuel oil. For example, in a ground installation type of measuring apparatuses, a main body case is disposed on an island provided in a site of the oil station, and the fuel oil amount indicator is attached to a display unit case on an upper side of the main body case. As the fuel oil amount indicators, various types have been used, but in recent years, liquid crystal displays have been used. The present applicant has disclosed a technique regarding a display device of a measuring apparatus in which a diffusion plate for diffusing light and a coloring plate for transmitting light are disposed on a back face side of a transmission type liquid crystal display panel, and a back light illumination is disposed on a back face side of the coloring plate (e.g., refer to Japanese Patent Application Laid-Open No. 2001-242798 (pages 2 to 3, FIGS. 1 to 4)).

In a conventional liquid crystal display, display elements of liquid crystals used do not emit light by themselves, and therefore, an illumination such as a back light is provided so that the liquid crystal display can be used at night. However, a lifetime of the back light is short, and for the exchange of the light, maintenance work which is troublesome and needs expert knowledge might be required. Moreover, the conventional liquid crystal display tends to be hard to see an image thereon, when it is exposed to the sunlight in the outdoors.

The present invention has been developed in view of the foregoing situation, and it is an object of the present invention to provide a fuel oil amount indicator of a measuring apparatus which makes it possible to prolong a lifetime of the indicator and to omit maintenance work and which is easily viewable at any time of the day or night.

SUMMARY OF THE INVENTION

In order to achieve the above object, an invention according to claim 1 is characterized by having an indicator in which a plurality of light emitting elements are arrayed. The constitution of the indicator in which the plurality of light emitting elements are arrayed enables a display effect having a high visibility.

An invention according to claim 2 is characterized in that the light emitting elements are high luminance LEDs. The use of the high luminance LEDs as the light emitting elements enables the prolongation of a lifetime of the indicator, the omission of maintenance work, and the reduction of power consumption.

An invention according to claim 3 is characterized in that the light emitting elements have a plurality of luminous colors predetermined to correspond to a type of fuel oil. Such light emission as to correspond to the type of fuel oil can prevent mixing of fuel oils.

An invention according to claim 4 is characterized in that the indicator is provided with inclination means for inclining a display surface in response to an operation of an angle adjustment operating portion. The display surface of the indicator can be inclined by the inclination means in accordance with the operation of the angle adjustment operating portion, and therefore, visibility can be improved regardless of a fuel oil feed position.

An invention according to claim 5 is characterized in that the indicator is provided with a diffusion plate for diffusing light to a front face of the light emitting elements. The diffusion plate disposed on the front face of the light emitting elements enables displaying characters as a continuous line.

An invention according to claim 6 is characterized in that an outside light sensor for detecting brightness of outside light is provided in the vicinity of the indicator to change a light emission intensity of the light emitting elements in accordance with the brightness detected by the outside light sensor. The detection of the brightness of the outside light by the outside light sensor to change the light emission intensity of the light emitting elements enables that when outside is bright, the light emission intensity can be increased to always keep a good visibility of the indicator.

In the indicator of the present invention, a plurality of light emitting elements are arrayed, and as the light emitting elements, high luminance LEDs are used. In consequence, a lifetime of the indicator can be prolonged and maintenance work can be omitted. Furthermore, a light emission intensity of the light emitting elements can be changed in accordance with brightness detected by an outside light sensor which detects the brightness of outside light, so that a good visibility of the indicator can always be kept.

DESCRIPTION OF THE PREFERRED EMBODIMENTS

Figure 1:
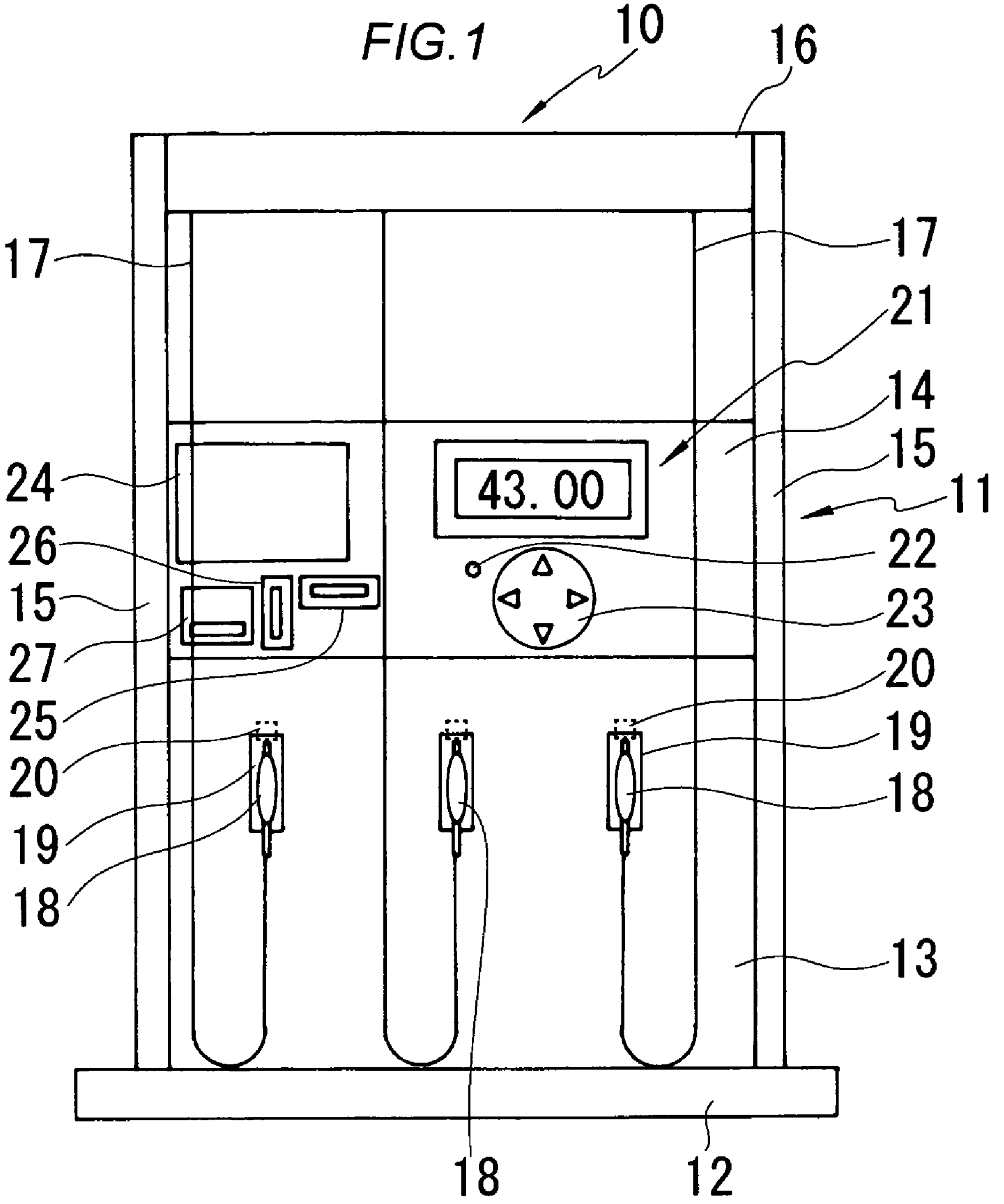
FIG. 1 is a front view of a measuring apparatus according to a first embodiment of the invention.
Figure 2:
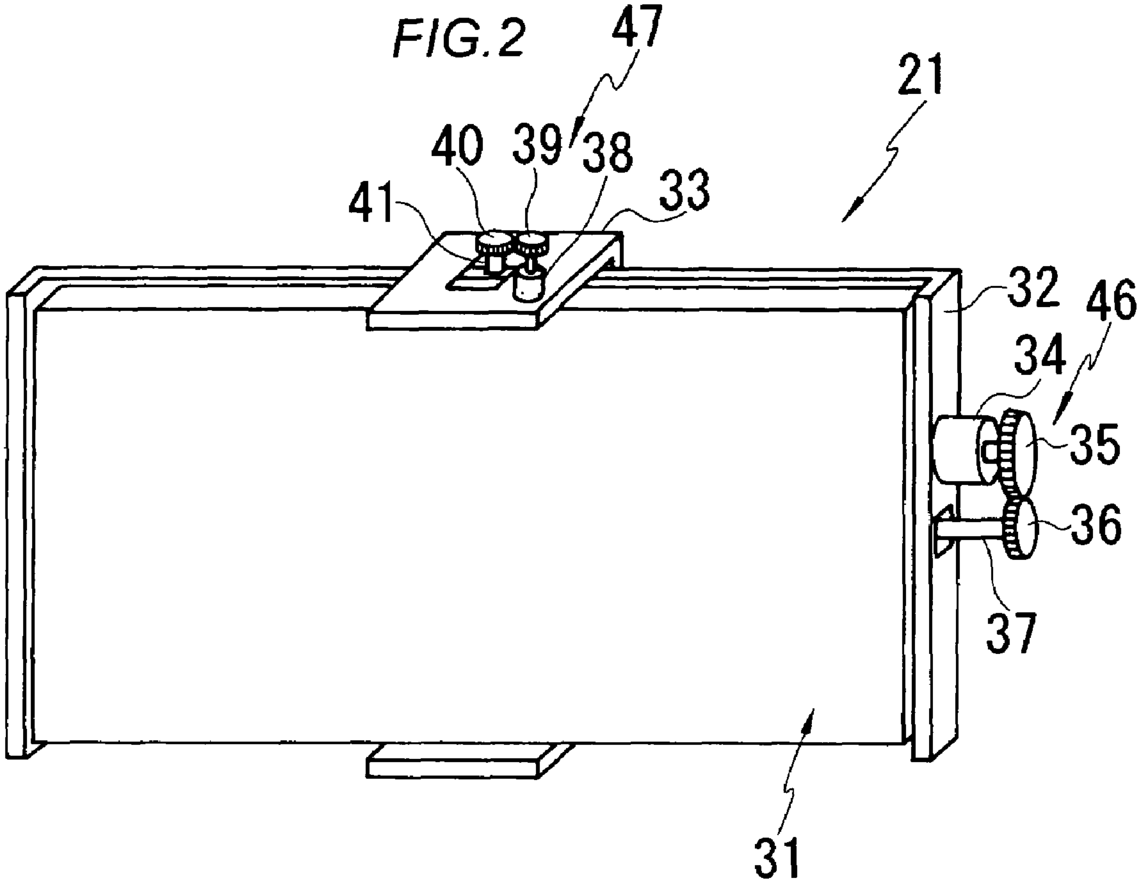
FIG. 2 is a perspective view of an indicator part of the measuring apparatus according to the first embodiment of the invention.
Figure 3:
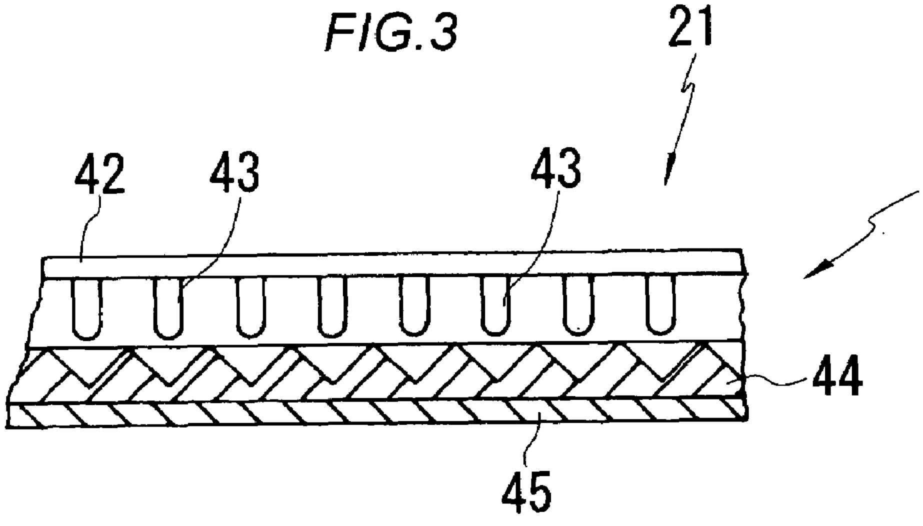
FIG. 3 is a cross-sectional view of an indicator body of the measuring apparatus according to the first embodiment of the invention.
Figure 4:
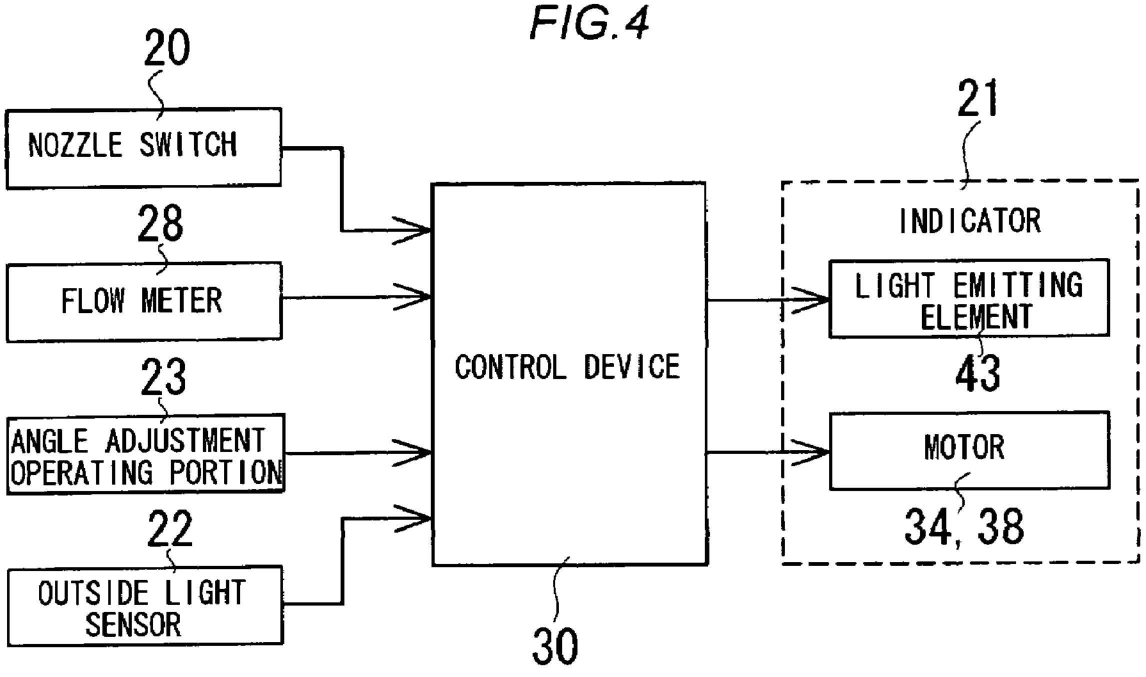
FIG. 4 is a block diagram explaining an operation of a fuel oil amount indicator of the measuring apparatus according to the first embodiment of the invention.

Hereinafter, the present invention will be described in detail by way of an embodiment with reference to accompanying drawings. FIG. 1 to FIG. 4 are views for explaining a ground installation type measuring apparatus according to a first embodiment of the present invention, and FIG. 1 is a front view of the measuring apparatus, FIG. 2 is a perspective view of an indicator part of the measuring apparatus, FIG. 3 is a cross-sectional view of an indicator body of the measuring apparatus, and FIG. 4 is a block diagram for explaining an operation of a fuel oil amount indicator of the measuring apparatus.

In these drawings, a measuring apparatus 10 according to the first embodiment is a ground installation type fuel oil-feeding apparatus for feeding any type of fuel oil such as regular gasoline, premium gasoline, or diesel oil. A main body case 11 is uprightly fixed onto an island in a site of an oil station. In this main body case 11, there are housed a fuel oil-feeding pump, a flow meter 28, and the like constituting a fuel oil-feeding mechanism for respective types of fuel oils.

The main body case 11 includes a device case 13 for housing the fuel oil-feeding mechanism arranged on a base plate 12, an indicator case 14 arranged on the device case 13, supporting columns 15 disposed on right and left sides of the device case 13 and the indicator case 14, a top case 16 provided between upper end portions of the supporting columns 15, 15, and the like. Each of fuel oil hoses 17 whose end portion is connected with each of fuel oil-feeding nozzles 18 is suspended from the top case 16 so as to communicate!with the fuel oil-feeding mechanism. Each of the fuel oil-feeding nozzles 18 can be hooked on each of nozzle hangers 19 provided on a front side of the device case 13. Further, a surface of the fuel oil-feeding nozzle 18 is colored to correspond to a type of fuel oil, for example, red for regular gasoline, yellow for premium gasoline, and green for diesel oil. The color of the nozzle 18 corresponds to a color displayed by the indicator, as will be described later in detail. A nozzle switch 20 for detecting a hanging state or an unhanging state of the fuel oil-feeding nozzle 18 is provided in the vicinity of the nozzle hangers 19.

On a front side of the indicator case 14, an indicator 21 which will be described in detail later is provided at an approximately center position thereof. On a lower side of the indicator 21, there are disposed an outside light sensor 22 which detects intensity of outside light, and an angle adjustment operating portion 23 which adjusts an inclination angle of a display surface of the indicator 21 so as to make it easy w see the indicator. A setting operation unit 24 to set the type of fuel oil, an amount of the fed fuel oil, or the like at a time of fuel oil feeding is provided on a part near the indicator 21 for setting. An insertion slot 25 of a paper money reader used to pay a fuel oil charge, a card reader 26, and a take-out port 27 of a fuel oil bill to be printed after the completion of fuel oil feeding, are disposed on a lower side of the setting operation unit 24. Further, a control device 30 which receives signals transmitted from the nozzle switch 20, a flaw meter 28, the angle adjustment operating portion 23, and the outside light sensor 22, and controls the indicator 21 is provided inside the indicator case 14.

As shown in FIG. 2, the indicator 21 comprises: an indicator body 31 in which a plurality of light emitting elements are arranged in a matrix form to display an amount of a fed fuel oil or the like; a first bracket 32 which is formed in a substantially U-shape surrounding a periphery of a back face side and right and left face sides of the indicator body 31 with a certain space therebetween, as well as which is mounted so as to be able to slightly incline a vertical display surface backward and forward with centering a horizontal axis located at an approximately center position of the indicator body 31; first inclination means 46 which causes the display surface of the indicator body 31 to incline in backward and forward directions with respect to the first bracket 32; a second bracket 33 which is formed in a substantially U-shape surrounding a periphery of a back side face of the first bracket 32 and upper and lower face sides of the indicator body 31 with a certain space therebetween, mounted so as to be able to slightly incline a display surface of the indicator body 31 left and right with centering a vertical axis located at an approximately center position of the first bracket 32, and as well as which is provided on a front face side of the indicator case 14; and second inclination means 47 which causes the first bracket 32 to incline in right and left directions with respect to the second bracket 33.

The first inclination means 46 comprises: a first motor 34 provided on a side face of the first bracket 32; a gear 35 mounted to an output shaft of the first motor 34; a gear 36 engaging with the gear 35; and a shaft 37 mounted with the gear 36 on one end side thereof and another end side of which is fixed to the horizontal axis on a side face of the indicator body 31 through an opening formed on the side face of the first bracket 32. The first inclination means 46 operates in a manner in which the first motor 34 is driven by control signals from the control device 30 to thereby slightly incline the vertical display surface of the indicator body 31 mounted to the first bracket 32 backward and forward. The second inclination means 47 comprises: a second motor 38 provided on an upper face of the second bracket 33; a gear 39 mounted to an output shaft of the second motor 38; a gear 40 engaging with the gear 39; and a shaft 41 mounted with the gear 40 on one end side thereof and another end side of which is fixed to the vertical axis on the side face of the indicator body 31 through an opening formed on a side face of the second bracket 33. The second inclination means 47 operates in a manner in which the second motor 38 is driven by control signals from the control device 30 to thereby slightly incline the display surface of the indicator body 31 mounted to the first bracket 32 right and left.

As shown in FIG. 3, the indicator body 31 includes light emitting elements 43 which are the high luminance LEDs being arrayed on an attached substrate 42, a diffusion plate 44 to diffuse light provided on the light emitting elements 43 side, and a filter 45 to transmit light provided on a front face of the diffusion plate 44, The light emitting element 43 is configured such that three of the high luminance LEDs, which respectively emit colors of red, yellow, and green, make a set and which is arrayed in a matrix form to make up characters in order to display the amount of the fed fuel oil. The diffusion plate 44 is formed from a transparent plate material such as acrylic or glass, and formed with notches on a surface facing the light emitting elements 43 to diffuse light. The diffusion plate 44 has a function to diffuse light from the adjacent light emitting elements 43, so that light seems continuous. The filter 45 has a property of easily transmitting red, yellow, and green light emitted from the high luminance LEDs as the light emitting element 43.

Next, an operation of the indicator 21 constructed as described above will be explained. First, when any type of fuel oil, such as regular gasoline, premium gasoline, or diesel oil, is fed, the fuel oil-feeding nozzle 18 corresponding to the type of fuel oil is removed from the nozzle hanger 19 to turn on the nozzle switch 20. Signals from the nozzle switch 20 are transmitted to the control device 30, and any of the high luminance LEDs as the light emitting elements emitting color of red, yellow, or green corresponding to the type of oil is enabled to emit color by the control device 30. When the indicator 21 is hard to see due to a positional relationship with a feeding position, by operating the angle adjustment operating portion 23, operation signals therefrom are transmitted to the control device 30. The motors 34, 38 of the first and the second inclination means 46, 47 are driven by the control device 30, thereby the inclination angle of the display surface of the indicator body 31 can be adjusted backward and forward or right and left so as to make the indicator easy to see. Subsequently, when the fuel oil is fed and signals from the flow meter 28 are transmitted to the control device 30, the light emitting elements 43 of the indicator 21 which are the high luminance LEDs corresponding to the type of fuel oil emit color to display a flow amount. Light emitted from the light emitting elements 43 of the indicator body 31, where the light emitting elements 43 are the high luminance LEDs emitting color of red, yellow or green, is diffused by the diffusion plate 44 to make displayed characters a continuous line. In addition, the filter 45 transmits red, yellow, or green light emitted from the high luminance LEDs. This arrangement makes the indicator 21 easy to see. In the case where the indicator 21 is provided outside and exposed to sunlight, detection signals regarding brightness of outside light detected by the outside light sensor 22 provided in the vicinity of the indicator 21 are transmitted to the control device 30. By controlling a light emission intensity of the light emitting element 43 to become higher by the control device 30, visibility of the indicator 21 is improved to make it easy to see the indicator. Moreover, when it is dark outside, for example, at night, the light emission intensity is controlled to be lowered.

In the fuel oil amount indicator constructed as described above, as the light emitting elements 43 of the indicator 21, the high luminance LEDs are used. In consequence, a lifetime of the indicator can be prolonged, maintenance work can be omitted, and power consumption can be reduced. Further, the surface of the fuel oil-feeding nozzle 18 corresponding to the type of fuel oil is colored in red, yellow, or green to correspond to the type of fuel oil, and the light emitting elements 43 which are the high luminance LEDs emitting color corresponding to color of the fuel oil-feeding nozzles 18 emit light, therefore, mixing of fuel oil caused by erroneously feeding a different type of fuel oil can be prevented. The display surface of the indicator body 31 of the indicator 21 can be inclined backward and forward or right and left by operating the angle adjustment operating portion 23, so that the display surface can be made easily visible in accordance with a fuelling place. Moreover, as the indicator 21 is provided with the diffusion plate 44 to diffuse light to a front face of the light emitting element 43, characters are displayed as a continuous line. By making red, yellow, or green light emitted from the high luminance LED easily transmit through by the filter 45, the indicator 21 can be easy to see. Therefore, an overall visibility is improved. Furthermore, by detecting brightness of the outside light by the outside light sensor 22, when the indicator is provided outside and exposed to sunlight, the light emission intensity is increased, and when it is dark outside, for example, at night, the light emission intensity is decreased. As a result, visibility of the indicator 21 can be increased to make it easy to see the indicator.

Figure 5:
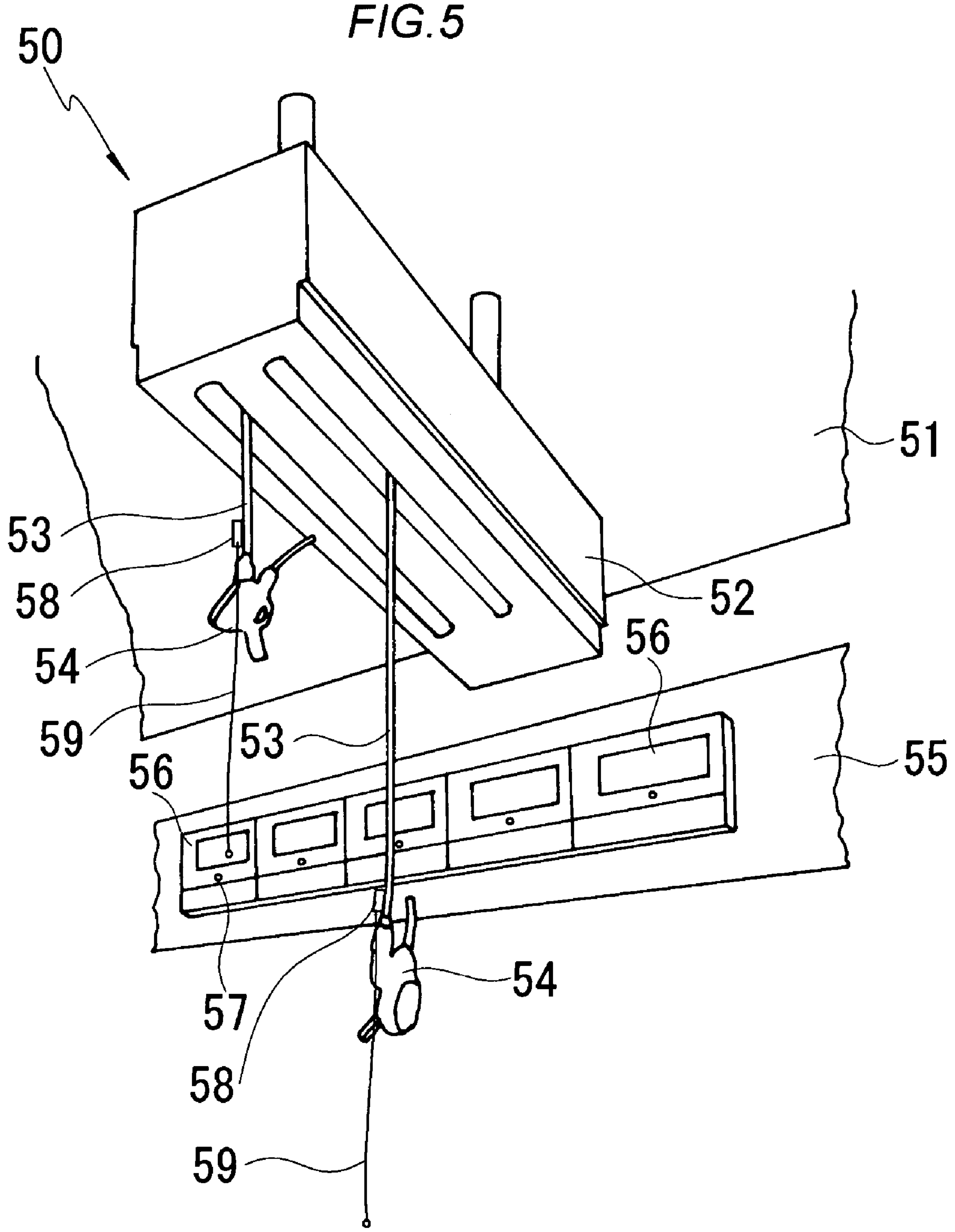
FIG. 5 is a perspective view explaining a measuring apparatus according to a second embodiment.

FIG. 5 is a perspective view explaining a measuring apparatus according to a second embodiment.

A measuring apparatus 50 according the second embodiment is a suspended type fuel oil-feeding apparatus for feeding any type of fuel oil, such as regular gasoline, premium gasoline, and diesel oil. A fuel oil hose processing case 52 is suspended from a canopy 51 provided at an oil station, and a fuel oil-feeding horse 53, one end side of which is communicated with a fuel oil-feeding mechanism and another end side of which is connected with a fuel oil-feeding nozzle 54, is suspended from the fuel oil hose processing case 52 above a fuel oil feeding area. A surface of the fuel oil-feeding nozzle 54 is colored to correspond to the type of fuel oil similarly to the above-described first embodiment. In the measuring apparatus 50, a fuel oil feeding operation is carried out by lowering the fuel oil-feeding horse 53 by an operation such as pulling a switch string 59 of a switch 58 corresponding to a nozzle switch provided in the vicinity of the fuel oil-feeding nozzle 54 for feeding the fuel oil, and the fuel oil-feeding nozzle 54 can be returned to a lifted position by operating a switch button or the like of the switch 58 at the time of completion of oil feeding. Furthermore, a indicator 56 is provided to a wall face 55 in the vicinity of the fuel oil feeding area, and an outside light sensor 57 is provided in the vicinity of the indicator 56. In the indicator 56, a plurality of light emitting elements using high luminance LEDs similar to the first embodiment are arrayed in a matrix form, and a diffusion plate and a filter are provided as in the first embodiment. Furthermore, as in the first embodiment, a control device receives signals from the nozzle switch, a flow meter, and the outside light sensor 57, so that the light emitting elements of the indicator 56 comprising high luminance LEDs can emit light.

In a fuel oil amount indicator of the measuring apparatus constructed as described above, similarly to the above described first embodiment, high-luminance LEDs are used as the light emitting elements, therefore, a lifetime of the indicator can be prolonged, maintenance work can be omitted, and power consumption can be reduced. Also, a surface of the fuel oil-feeding nozzle 54 corresponding to the type of fuel oil to be fed is colored to correspond to the type of fuel oil and the light emitting elements which are the high luminance LEDs emitting color corresponding to color of the fuel oil-feeding nozzles 54, therefore, mixing of fuel oil caused by erroneously feeding the different type of fuel oil can be prevented. Since the indicator 56 is provided with the diffusion plate and the filter on a front face of the light emitting element, the indicator 56 is easy to see and an overall visibility is improved. Moreover, by detecting brightness of outside light by the outside light sensor 57, when the indicator is provided outside and exposed to sunlight, the light emission intensity of the light emitting elements is increased, and when it is dark outside, for example, at night, the light emission intensity is decreased. As a result, visibility of the indicator 56 can be improved to make it easy to see the indicator.

Meanwhile, in the indicators 21, 56 of the respective embodiments described above, the light emitting elements using the high-luminance LEDs are arrayed in a matrix form, and the high-luminance LEDs preferably have emission colors decided in accordance with the type of fuel oil. In addition, in the ground installation type measuring instrument 10 according to the first embodiment, the display surface of the indicator 31 can be inclined by the angle adjustment operating portion 23, however, the inclination means is merely an example and the invention is not limited to the embodiment, and the inclination means can be omitted when the indicator is easy to see from the fuel oil feed position. In addition, the measuring apparatus of the invention is not limited to that described in the embodiments, and which can be applied to a ground installation type or a suspended type fuel oil-feeding apparatus that can feed arbitrary type of oil.

The present invention can be applicable to a fuel oil amount indicator of a measuring apparatus to display a fuel oil amount fed to a vehicle or the like at an oil station.

What is claimed is:

1. A fuel oil amount indicator and measuring apparatus comprising:

a plurality of fueling nozzles, each one of said plurality of fueling nozzles having one of a plurality of colors, and the fueling nozzles having different colors from each other;

a fueling mechanism delivering a plurality of fuel types respectively to said plurality of fueling nozzles, each of said colors respectively corresponding to one of said plurality of fuel types, and said fueling mechanism delivering each of said fuel types respectively only to said fueling nozzles having a color corresponding to the color corresponding to said fuel type;

an indicator in which a plurality of light emitting elements are arrayed, wherein the light emitting elements have a plurality of luminous colors predetermined to correspond to each of said colors corresponding to said fuel types;

a selection mechanism configured for a user to select one of said fuel types; and a controller controlling operation of said fueling mechanism and said indicator and responsive to said selection mechanism so as to control said indicator to illuminate said light emitting elements to present a display in said color corresponding to the selected one of said fuel types and concurrently control said fueling mechanism to deliver the selected one of said fuel types via one of said fueling nozzles having said color corresponding to the selected one of said fuel types such that a same color is presented on said display and said one of said fueling nozzles for the selected one of the fuel types.

2. The fuel oil amount indicator and measuring apparatus according to claim 1, wherein the emitting elements are high luminance LEDs.

3. The fuel oil amount indicator and measuring apparatus according to claim 1, wherein the indicator is provided with inclination means for inclining a display surface in response to an operation of an angle adjustment operating portion, said inclination means operates to tilt said display surface about a horizontal axis in response to a first control portion of said angle adjustment operation portion configured for operation by a user, and said inclination means operates to rotate said display surface about a vertical axis in response to a second control portion of said angle adjustment operation portion configured for operation by the user.

4. The fuel oil amount indicator and measuring apparatus according to claim 1, wherein the indicator is provided with a diffusion plate to diffuse light to a front face of the light emitting elements.

5. The fuel oil amount indicator and measuring apparatus according to claim 1, further comprising an outside light sensor to detect brightness of outside light provided in a vicinity of the indicator to change a light emission intensity of the light emitting elements in accordance with the brightness detected by the outside light sensor.

6. A fuel oil amount indicator and measuring apparatus comprising:

a plurality of fueling nozzles;

a fueling mechanism delivering a plurality of fuel types respectively to said plurality of fueling nozzles;

an indicator in which a plurality of light emitting elements are arrayed, wherein the light emitting elements have a plurality of luminous colors, the indicator being provided with inclination means for inclining a display surface in response to an operation of an angle adjustment operating portion, said inclination means operating to tilt said display surface about a horizontal axis in response to a first control portion of said angle adjustment operation portion configured for operation by a user, and said inclination means operating to rotate said display surface about a vertical axis in response to a second control portion of said angle adjustment operation portion configured for operation by the user;

a selection mechanism configured for a user to select one of said fuel types; and a controller controlling operation of said fueling mechanism and said indicator and responsive to said selection mechanism so as to control said indicator to illuminate said light emitting elements to present a display in one of said colors corresponding to the selected one of said fuel types and concurrently control said fueling mechanism to deliver die selected one of said fuel type.

7. The fuel oil amount indicator and measuring apparatus according to claim 6, wherein said first control portion of said angle adjustment operation portion includes an upward user input operating to tilt said display toward an upward direction, and a downward user input operating to tilt said display toward a downward direction.

8. The fuel oil amount indicator and measuring apparatus according to claim 7, wherein said second control portion of said angle adjustment operation portion includes a rightward user input operating to pivot said display toward a rightward direction, and a leftward user input operating to pivot said display toward a leftward direction.

9. The fuel oil amount indicator and measuring apparatus according to claim 6, wherein said second control portion of said angle adjustment operation portion includes a rightward user input operating to pivot said display toward a rightward direction, and a leftward user input operating to pivot said display toward a leftward direction.

* * * * *